United States Patent
Yang et al.

(10) Patent No.: US 10,428,811 B2
(45) Date of Patent: Oct. 1, 2019

(54) RECIPROCATING COMPRESSOR AND METHOD FOR ASSEMBLING THE SAME

(71) Applicant: LG Electronics Inc., Seoul (KR)

(72) Inventors: Yongjin Yang, Seoul (KR); Jaeho Cho, Seoul (KR); Dowan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 705 days.

(21) Appl. No.: 14/936,320

(22) Filed: Nov. 9, 2015

(65) Prior Publication Data

US 2016/0131125 A1    May 12, 2016

(30) Foreign Application Priority Data

Nov. 10, 2014 (KR) .................... 10-2014-0155387

(51) Int. Cl.
*F04B 39/12* (2006.01)
*F04B 53/00* (2006.01)
(Continued)

(52) U.S. Cl.
CPC ............ *F04B 39/123* (2013.01); *F04B 37/00* (2013.01); *F04B 39/0055* (2013.01);
(Continued)

(58) Field of Classification Search
CPC ............ F04B 39/0055; F04B 39/123; F04B 39/0061; F04B 39/122; F04B 39/0027;
(Continued)

(56) References Cited

U.S. PATENT DOCUMENTS 4,592,388 A * 6/1986 Wilcox ............... F16L 37/008
137/615
5,521,340 A * 5/1996 Thawani ............ B60H 1/00571
181/227
(Continued)

FOREIGN PATENT DOCUMENTS

CN      101801749 A      8/2010
DE    102008005820 A1   3/2009
(Continued)

*Primary Examiner* — Dominick L Plakkoottam
(74) *Attorney, Agent, or Firm* — Birch, Stewart, Kolasch & Birch, LLP

(57) ABSTRACT

The present disclosure relates to a reciprocating compressor and a method for assembling the same. According to an embodiment of the present disclosure, a reciprocating compressor includes: a shell to which a discharge pipe is coupled; a driving unit mounted inside the shell to generate a rotary force; a compression unit having a connecting rod configured to convert the rotary force to a straight driving force, a piston connected to the connecting rod, and a cylinder into which the piston is movably inserted; a discharge hose from which a refrigerant compressed in the cylinder is discharged, and disposed to abut an inner circumferential surface of the shell; and a connection member configured to connect the discharge hose to the discharge pipe, wherein at least a portion of the connection member is inserted into an inner portion of the discharge pipe, and another portion thereof is supported outside the discharge pipe.

8 Claims, 10 Drawing Sheets

(51) Int. Cl.
  *F04B 53/14* (2006.01)
  *F04B 37/00* (2006.01)
  *F16L 25/14* (2006.01)
  *F16L 25/00* (2006.01)
  *F04B 39/00* (2006.01)

(52) U.S. Cl.
  CPC ........ *F04B 39/0072* (2013.01); *F04B 39/121* (2013.01); *F04B 39/122* (2013.01); *F04B 53/004* (2013.01); *F04B 53/144* (2013.01); *F16L 25/0072* (2013.01); *F16L 25/14* (2013.01)

(58) Field of Classification Search
  CPC ... F04C 29/065; F04C 29/068; F16L 25/0072; F16L 25/10; F16L 25/14; F16L 31/00
  USPC .......................... 285/238, 239, 241, 242, 345
  See application file for complete search history.

(56) References Cited

U.S. PATENT DOCUMENTS

| | | | | |
|---|---|---|---|---|
| 5,794,989 | A * | 8/1998 | Ryu | F16L 21/08 285/345 |
| 6,598,905 | B2 * | 7/2003 | Campbell | F16L 33/2076 285/239 |
| 6,772,519 | B2 * | 8/2004 | St. James | F16L 33/02 285/241 |
| 7,415,991 | B2 * | 8/2008 | Meehan | E03C 1/0404 137/801 |
| 2001/0046111 | A1 * | 11/2001 | Koike | F16L 11/127 361/215 |
| 2002/0127123 | A1 * | 9/2002 | Lee | F04B 39/0044 417/415 |
| 2003/0188545 | A1 | 10/2003 | Ramachandran et al. | |
| 2005/0106037 | A1 * | 5/2005 | Kim | F04B 39/0055 417/312 |
| 2007/0018454 | A1 * | 1/2007 | Krines | F16L 23/24 285/364 |
| 2008/0003115 | A1 | 1/2008 | Kim | |
| 2008/0008603 | A1 * | 1/2008 | Schoegler | F04B 39/0061 417/312 |
| 2008/0073908 | A1 * | 3/2008 | Hillhouse | B05B 15/65 285/242 |
| 2008/0083582 | A1 | 4/2008 | Towne et al. | |
| 2010/0202893 | A1 | 8/2010 | Bacher et al. | |
| 2010/0226805 | A1 | 9/2010 | Kulmer | |

FOREIGN PATENT DOCUMENTS

| | | |
|---|---|---|
| JP | 58-186289 U | 12/1983 |
| JP | 4-353277 A | 12/1992 |
| KR | 10-2008-0040168 A | 5/2008 |
| KR | 10-2010-0085760 A | 7/2010 |
| WO | WO 2006/089303 A2 | 8/2006 |

* cited by examiner

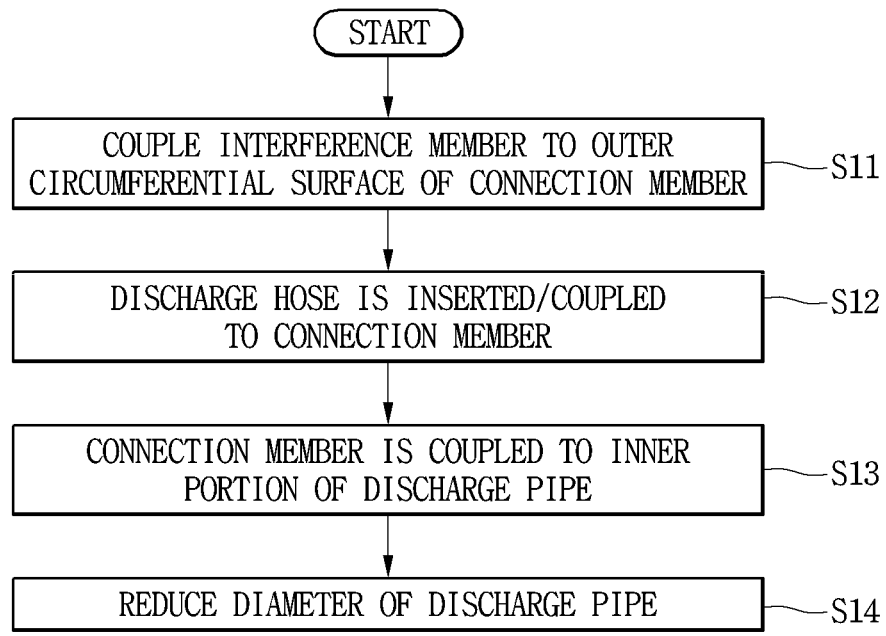

RECIPROCATING COMPRESSOR AND METHOD FOR ASSEMBLING THE SAME

CROSS-REFERENCE TO RELATED APPLICATION(S)

This application claims priority under 35 U.S.C. § 119 to Korean Application No. 10-2014-0155387, filed in Korea on Nov. 10, 2014, whose entire disclosure is hereby incorporated by reference.

BACKGROUND

1. Field

The present disclosure relates, generally, to a reciprocating compressor and, more particularly, to a reciprocating compressor including a discharge hose.

2. Background

A reciprocating compressor refers to an apparatus that compresses a fluid by discharging a refrigerant after suctioning and compressing the refrigerant by a reciprocating motion of a piston inside a cylinder. The reciprocating compressor can be classified as connected type reciprocating compressor or a vibrating type reciprocating compressor in accordance with a method for driving a piston. Here, the connected type reciprocating compressor compresses a refrigerant by a reciprocating motion inside a cylinder of a piston connected to a rotary shaft of a driving unit through a connecting rod, and the vibrating type reciprocating compressor compresses a refrigerant by a reciprocating motion inside a cylinder of a piston which vibrates by being connected to a mover of a reciprocating motor.

The connected type reciprocating compressor is disclosed in Korean Unexamined Patent Application Publication No. 10-2010-0085760. The connected type reciprocating compressor disclosed in the unexamined patent application includes a housing shell forming a closed space, a driving unit disposed inside the housing shell to provide a driving force, a compression unit connected to a rotary shaft of a driving unit to compress a refrigerant by a reciprocating motion of a piston inside a cylinder using the driving force of the driving unit, and a suction/discharge unit suctioning a refrigerant and discharging the refrigerant compressed by the reciprocating motion of the compression unit.

A discharge hose from which a compressed refrigerant is discharged is connected to the suction/discharge unit, and the discharge hose is coupled to a discharge pipe which is coupled to the shell of the compressor.

According to a conventional reciprocating compressor, the discharge hose is moved by a pressure of the discharged refrigerant because coupling between the discharge hose and the discharge pipe is not firm. In this process, the discharge hose is damaged due to contact with a housing shell at a high temperature. In addition, as the coupling between the discharge hose and the discharge pipe becomes loose, the refrigerant leaks.

SUMMARY

To solve the problems mentioned above, the present disclosure is directed to providing a reciprocating compressor in which a discharge hose and a discharge pipe can be firmly coupled.

According to an embodiment of the present disclosure, a reciprocating compressor includes: a shell to which a discharge pipe is coupled; a driving unit mounted inside the shell to generate a rotary force; a compression unit having a connecting rod configured to convert the rotary force to a straight driving force, a piston connected to the connecting rod, and a cylinder into which the piston is movably inserted; a discharge hose from which a refrigerant compressed in the cylinder is discharged, and disposed to abut an inner circumferential surface of the shell; and a connection member configured to connect the discharge hose to the discharge pipe, wherein at least a portion of the connection member is inserted into an inner portion of the discharge pipe, and the other portion thereof is supported outside the discharge pipe.

In addition, the connection member may have a stepped shape.

In addition, the connection member may include a first main connection body having an insertion unit into which the discharge hose is inserted; and a second main connection body configured to extend in steps from the first main connection body and inserted into an inner portion of the discharge pipe.

In addition, the connection member may further include a locking step formed between the first main connection body and the second main connection body, and an end portion of the discharge pipe may be supported by the locking step.

In addition, with respect to the locking step, the width or diameter of the first main connection body in one direction may be formed greater than the width or diameter of the second main connection body in one direction.

In addition, the connection member may further include an interference member interposed between an outer circumferential surface of the second main connection body and an inner circumferential surface of the discharge pipe.

In addition, the interference member may include a first interference member and a second interference member installed apart from each other on the outer circumferential surface of the second main connection body.

In addition, the interference member may include an O-ring installed at a groove of the second main connection body.

In addition, the reciprocating compressor may further include a muffler assembly into which a refrigerant compressed in the cylinder is introduced. The discharge hose may extend from the muffler assembly toward the discharge pipe.

In addition, the reciprocating compressor may further include a hose fixing unit which clamps a central portion of the discharge hose to separate the discharge hose from an inner surface of the shell.

According to another aspect of the present disclosure, a reciprocating compressor includes a shell to which a discharge pipe is coupled; a driving unit mounted inside the shell to generate a rotary force; a compression unit having a connecting rod configured to convert the rotary force to a straight driving force, a piston connected to the connecting rod, and a cylinder into which the piston is movably inserted; a discharge muffler into which a refrigerant compressed in the cylinder is introduced; a discharge hose coupled to the discharge muffler and configured to extend toward the discharge pipe; and a connection member configured to connect the discharge hose to the discharge pipe, wherein the connection member includes a first main connection body into which the discharge hose is inserted; and a second main connection body configured to extend from the first main connection body toward an inner portion of the discharge pipe.

In addition, the first main connection body may be positioned outside the discharge pipe, and the second main connection body may be positioned inside the discharge pipe.

In addition, the second main connection body may include an outer circumferential surface coupled to an inner circumferential surface of the discharge pipe.

In addition, the connection member may include a locking step formed between the first main connection body and the second main connection body to support an outer surface of the discharge pipe.

According to another embodiment of the present disclosure, a method for assembling a reciprocating compressor includes: inserting a discharge hose into a first main connection body of a connection member; inserting a second main connection body of the connection member into a discharge pipe; supporting the discharge pipe by a locking step of the connection member; and reducing the diameter of the discharge pipe.

In addition, the method for assembling a reciprocating compressor may further include installing an interference member on an outer circumferential surface of the connection member.

In addition, the locking step may be formed between the first main connection body and the second main connection body, and the diameter of the first main connection body may be formed greater than that of the second main connection body.

In addition, the reducing of the diameter of the discharge pipe may include bringing an inner surface of the discharge pipe into close contact with the interference member.

BRIEF DESCRIPTION OF THE DRAWINGS

Embodiments will be described in detail with reference to the following drawings in which like reference numerals refer to like elements, and wherein:

FIG. 10 is a flow chart illustrating a process of assembling the discharge hose with the discharge pipe according to an embodiment of the present disclosure.

DETAILED DESCRIPTION

The present disclosure will become more apparent by describing preferred embodiments of the present disclosure in detail with reference to the accompanying drawings. The embodiments described herein are illustratively shown to help in understanding of the present disclosure, and it should be understood that the present disclosure may be executed in various ways that differ from the embodiments described herein. In addition, to assist in understanding of the present disclosure, the accompanying drawings may not reflect actual scale, and the size of some elements may be exaggerated.

Figure 1:
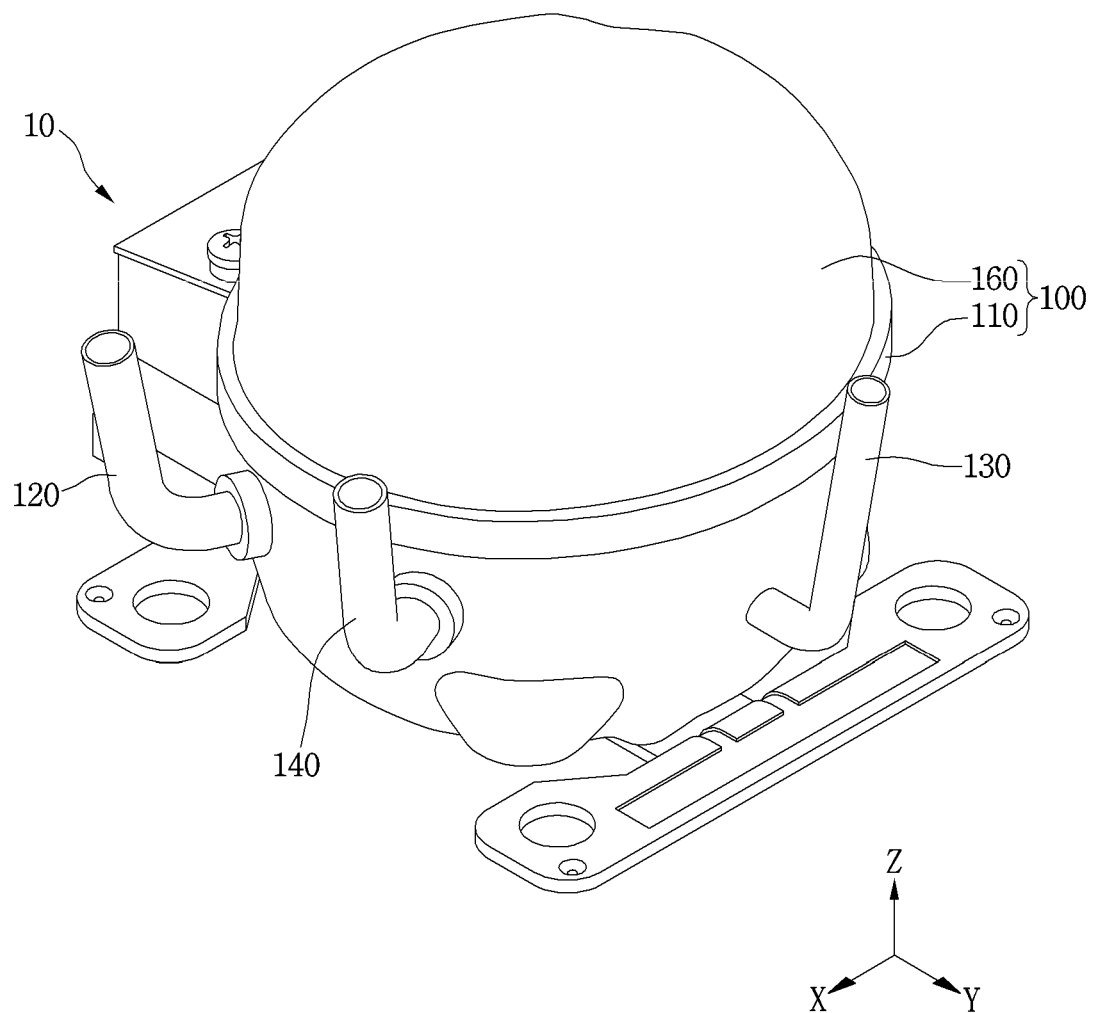
FIG. 1 is a perspective view of a reciprocating compressor according to an embodiment of the present disclosure.
Figure 2:
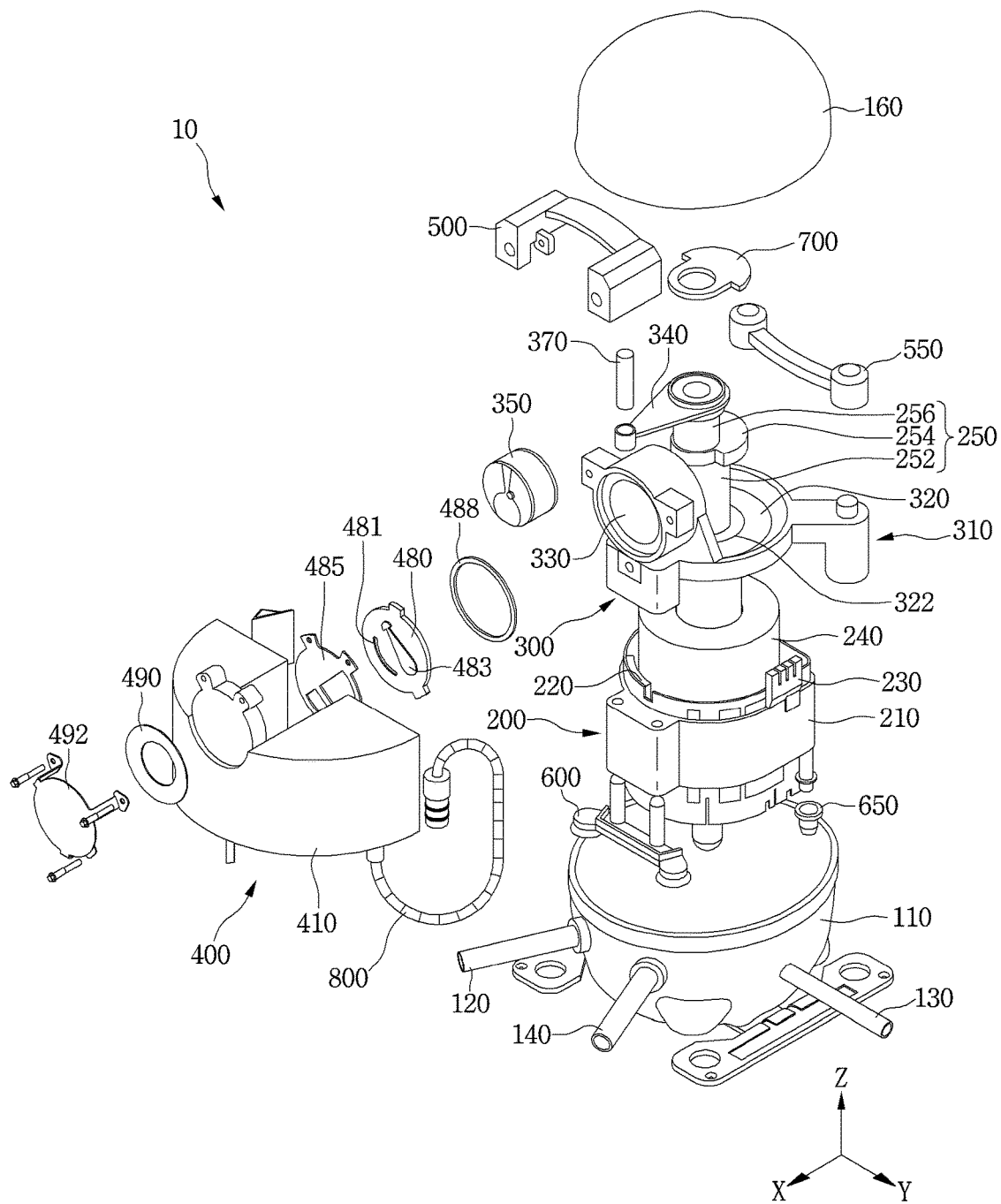
FIG. 2 is an exploded perspective view of a reciprocating compressor according to an embodiment of the present disclosure.
Figure 3:
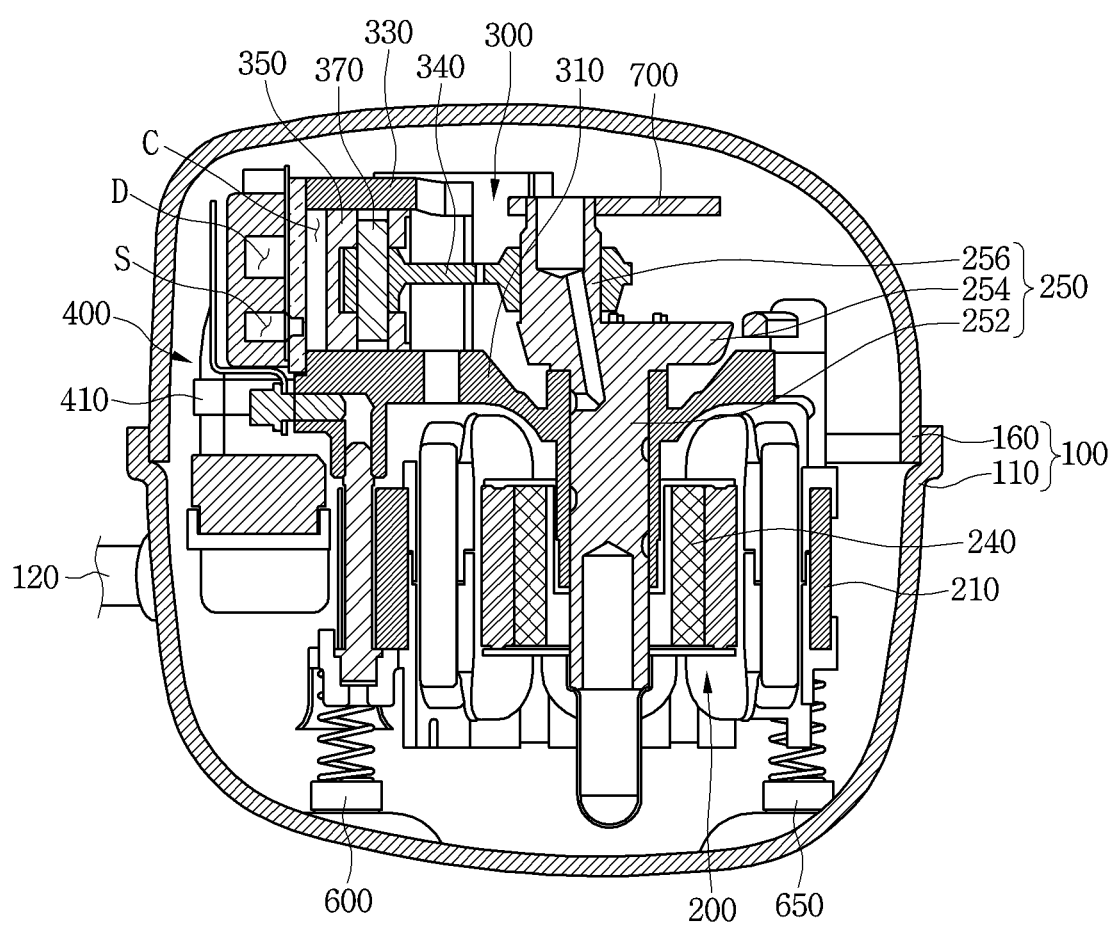
FIG. 3 is a cross-sectional view of a reciprocating compressor according to an embodiment of the present disclosure.

FIG. 1 is a perspective view of a reciprocating compressor according to an embodiment of the present disclosure, FIG. 2 is an exploded perspective view of a reciprocating compressor according to an embodiment of the present disclosure, and FIG. 3 is a cross-sectional view of a reciprocating compressor according to an embodiment of the present disclosure.

Referring to FIGS. 1 to 3, a reciprocating compressor 10 according an embodiment of the present disclosure may include a shell 100 forming an exterior, a driving unit or driver 200 disposed at an inner space of the shell 100 to provide a driving force, a compression unit or compressor 300 configured to receive the driving force from the driving unit 200 to compress a refrigerant by a linear reciprocating motion, and a suction/discharge unit or suction/discharge assembly 400 configured to suction a refrigerant for compressing a refrigerant in the compression unit 300 and discharge the refrigerant compressed in the compression unit 300.

The shell 100 may form a closed space at an inner portion thereof and accommodate various types of parts that form the reciprocating compressor 10 in the closed space. The shell 100 may be formed of a metallic material and include a lower shell 110 and an upper shell 160.

The lower shell 110 may be formed in a nearly hemispherical shape, and, together with the upper shell 160, forms an accommodation space which accommodates various parts forming the driving unit 200, the compression unit 300 and the discharge unit 400. The lower shell 110 may be called a "main compressor body" and the upper shell 160 may be called a "compressor cover."

A suction pipe 120, a discharge pipe 130, a process pipe 140, and a power unit are disposed at the lower shell 110. The suction pipe 120 may introduce a refrigerant into an inner portion of the shell 100 and be mounted by penetrating the lower shell 110. The suction pipe 120 may be mounted separately from the lower shell 110 or be integrated with the lower shell 110.

The discharge pipe 130 may discharge a refrigerant compressed in the shell 100 and be mounted by penetrating the lower shell 110. The discharge pipe 130 may also be mounted separately from the lower shell 110 or integrated with the lower shell 110.

A discharge hose 800 of the suction/discharge unit 400, to be described in greater detail below, may be connected to the discharge pipe 130. A refrigerant introduced into the suction pipe 120 and compressed by the compression unit 300 may pass through the discharge hose 800 of the suction/discharge unit 400 and be discharged to the discharge pipe 130.

The process pipe 140 may be provided to charge a refrigerant in an inner portion of the shell 100 after sealing the inner portion of the shell 100, and, similar to the suction pipe 120 and the discharge pipe 130, may be mounted by penetrating the lower shell 110.

The upper shell 160 may form the accommodation space together with the lower shell 110, and be formed in a nearly hemispherical shape similar to that of the lower shell 110.

The upper shell 160 may be coupled to the lower shell 110 at an upper portion of the lower shell 110 to form a closed space therein.

The driving unit 200 may include stator elements 210 and 220, an insulator 230, a rotor 240, and a rotary shaft 250. The stator elements 210 and 220 are portions that are fixed during an operation of the driving unit 200 and may include a stator core 210 and a stator coil 220.

The stator core 210 may be formed of a metallic material, and may form a nearly cylindrical shape having a hollow formed therein. In addition, the stator coil 220 may be mounted inside the stator core 210. When power is applied from the outside, the stator coil 220 generates an electromagnetic force to perform an electromagnetic reciprocal action with the stator core 210 and the rotor 240. As a result, the driving unit 200 may generate a driving force to be converted to a reciprocating motion of the compression unit 300.

The insulator 230 may be disposed between the stator core 210 and the stator coil 220 to prevent direct contact between the stator core 210 and the stator coil 220 because generation of the electromagnetic force from the stator coil 220 may be interrupted if the stator coil 220 comes in direct contact with the stator core 210. The insulator 230 may enable the stator core 210 and the stator coil 220 to be a predetermined distance from each other.

The rotor 240 is a portion which rotates during the operation of the driving unit 200. The rotor 240 may be rotatably disposed inside the stator coil 220 and installed inside the insulator 230. A magnet may be disposed at the rotor 240. When power is supplied from the outside, the rotor 240 may rotate by the electromagnetic reciprocal action with the stator core 210 and the stator coil 220. A rotary force in accordance with the rotation of the rotor 240 may act as a driving force capable of driving the compression unit 300.

The rotary shaft 250 may be installed inside the rotor 240 and mounted to penetrate the rotor 240 in a vertical direction (z-axis direction in the figures), and may rotate together with the rotor 240. In addition, the rotary shaft 250 may be connected to a connecting rod 340, discussed in greater detail below, to transmit the rotary force generated in the rotor 240 to the compression unit 300.

Specifically, the rotary shaft 250 may include a base shaft 252, a rotary plate 254, and an eccentric shaft 256. The base shaft 252 may be mounted inside the rotor 240 in the vertical direction or a longitudinal direction. When the rotor 240 rotates, the base shaft 252 may rotate together with the rotor 240.

The rotary plate 254 may be installed at one side of the base shaft 252, and be rotatably mounted on a rotary plate seating unit 320 of a cylinder block 310, which will be described below.

The eccentric shaft 256 may protrude upward from an upper surface of the rotary plate 254. Specifically, the eccentric shaft 256 may protrude from a position eccentric from an axial center of the base shaft 252 to eccentrically rotate when the rotary plate 254 rotates. The connecting rod 340 may be mounted on the eccentric shaft 256. In accordance with the eccentric rotation of the eccentric shaft 256, the connecting rod 340 may linearly reciprocate in a horizontal direction.

The compression unit 300 may include the cylinder block 310, the connecting rod 340, a piston 350, and a piston pin 370. The cylinder block 310 may be disposed at the driving unit 200, more specifically, above the rotor 240, and mounted inside the shell 100. The cylinder block 310 may include the rotary plate seating unit 320 and a cylinder 330.

The rotary plate seating unit 320 may be formed at a lower portion of the cylinder block 310 to rotatably accommodate the rotary plate 254. A shaft opening 322 through which the rotary shaft 250 can penetrate may be formed at the rotary plate seating unit 320.

The cylinder 330 may be provided at a front portion of the cylinder block 310, and disposed to accommodate the piston 350. The piston 350 may reciprocate in the horizontal direction and a compression space (C) capable of compressing a refrigerant may be formed at an inner portion of the cylinder 330.

The cylinder 330 may be formed of an aluminum material. As an example, the cylinder 330 may be formed of aluminum or an aluminum alloy. Due to the aluminum material, which is a substantially nonmagnetic material, a magnetic flux generated in the rotor 240 may not be transmitted to the cylinder 330. Accordingly, the magnetic flux generated in the rotor 240 may be prevented from being transmitted to the cylinder 330 and leaking from the cylinder 330.

The connecting rod 340 transmits the driving force provided from the driving unit 200 to the piston 350, and, as described above, may convert a rotary motion of the rotary shaft 250 to a linear reciprocating motion. Specifically, the connecting rod 340 may linearly reciprocate in the horizontal direction when the rotary shaft 250 rotates. The connecting rod 340 may be formed of a sintered alloy material.

The piston 350 compresses a refrigerant, and may be accommodated in the cylinder 330 so as to be capable of reciprocating in the horizontal direction. The piston 350 may be connected to the connecting rod 340 and the piston 350 may linearly reciprocate in the cylinder 330 in accordance with a motion of the connecting rod 340. In accordance with the reciprocating motion of the piston 350, a refrigerant introduced from the suction pipe 120 may be compressed in the cylinder 330.

Similar to the cylinder 330, the piston 350 may be formed of an aluminum material, such as aluminum or an aluminum alloy. Consequently, a magnetic flux generated in the rotor 240 may be prevented from leaking to the outside through the piston 350.

The piston 350 may be formed of the same material as the cylinder 330 and have a thermal expansion coefficient almost equal to that of the cylinder 330. As the piston 350 has a thermal expansion coefficient almost equal to that of the cylinder 330, the piston 350 may be thermally deformed almost as much as the cylinder 330 in an internal environment of the shell 100 at a high temperature (generally, approximately 100° C.) when the reciprocating compressor 10 operates. Consequently, interference between the piston 350 and the cylinder 330 may be prevented when the piston 350 reciprocates in the cylinder 330.

The piston pin 370 may couple the piston 350 to the connecting rod 340. Specifically, the piston pin 370 may penetrate the piston 350 and the connecting rod 340 in the vertical direction and connect the piston 350 to the connecting rod 340.

The suction/discharge unit 400 may include a muffler assembly 410, a valve assembly 480, the discharge hose 800, a plurality of gaskets 485 and 488, an elastic member 490 and a clamp 492.

The muffler assembly 410 may transfer a refrigerant suctioned from the suction pipe 120 to an inner portion of the cylinder 330 and transfer a refrigerant compressed in the compression space (C) of the cylinder 330 to the discharge pipe 130. To assist in this process, a suction space (S) configured to accommodate the refrigerant suctioned from the suction pipe 120 and a discharge space (D) configured to accommodate the refrigerant compressed in the compression space (C) of the cylinder 330 may be provided at the muffler assembly 410.

Specifically, the refrigerant suctioned from the suction pipe 120 may be introduced into a suction space (S) of a suction/discharge tank 426 through first and second assemblies 430 and 420, which may be referred to as suction mufflers, which are described in greater detail below. In addition, the refrigerant compressed in the cylinder 330 may pass through a discharge space (D) of the suction/discharge tank 426, through third and fourth assemblies 425 and 438, which may be referred to as discharge mufflers, and be discharged to the outside of the reciprocating compressor 10 through the discharge hose 800.

The valve assembly 480 may guide the refrigerant in the suction space (S) to the inner portion of the cylinder 330 or guide the refrigerant compressed in the cylinder 330 to the discharge space (D). A discharge valve 483 openably/closably mounted to discharge the refrigerant compressed in the compression space (C) to the discharge space (D) may be provided at a front surface of the valve assembly 480, and a suction valve 481 openably/closably mounted to discharge the refrigerant in the suction space (S) to the compression space (C) of the cylinder 330 may be provided at a rear surface of the valve assembly 480. In other words, the discharge valve 483 may be disposed at the front surface of the valve assembly 480, and the suction valve 481 may be disposed at the rear surface of the valve assembly 480. Actions of the discharge valve 483 and the suction valve 481 will be briefly described.

When the refrigerant compressed in the compression space (C) of the cylinder 330 is discharged, the discharge valve 483 may be opened and the suction valve 481 may be closed. Accordingly, the refrigerant compressed in the cylinder 330 may be introduced into the discharge space (D) without being introduced into the suction space (S). Conversely, when the refrigerant introduced into the suction space (S) is suctioned into the cylinder 330, the discharge valve 483 may be closed and the suction valve 481 may be opened. Accordingly, the refrigerant in the suction space (S) may be introduced into the cylinder 330 without being introduced into the discharge space (D).

The discharge hose 800 transfers a compressed refrigerant accommodated in the discharge space (D) to the discharge pipe 130, and may be coupled to the muffler assembly 410. For example, one side of the discharge hose 800 may be coupled to the muffler assembly 410 to be in communication with the discharge space (D) and the other side of the discharge hose 800 may be coupled to the discharge pipe 130.

The plurality of gaskets 485 and 488 may be provided to prevent leakage of a refrigerant, and may be respectively mounted on one side and the other side of the valve assembly 480. Specifically, the plurality of gaskets 485 and 488 may include a first gasket 485 and a second gasket 488. The first gasket 485 may be mounted in front of the valve assembly 480, and the second gasket 488 may be mounted behind the valve assembly 480.

The elastic member 490 supports the muffler assembly 410 during an operation of the reciprocating compressor 10, and may be mounted in front of the muffler assembly 410. The elastic member 490 may include a Belleville spring.

The clamp 492 may fix the valve assembly 480, the first gasket 485, the second gasket 488, and the elastic member 490 to the muffler assembly 410. The clamp 492 may be formed nearly in the shape of a trivet, and mounted on the muffler assembly 410 by a fastener such as a screw.

Furthermore, the reciprocating compressor 10 may further include a plurality of damper members 500, 550, 600 and 650, and a balance weight 700. The plurality of damper members 500, 550, 600, and 650 may buffer vibration of inner structures of the reciprocating compressor 10 generated during the operation of the reciprocating compressor 10. The plurality of damper members 500, 550, 600, and 650 may include a front damper 500, a rear damper 550, and lower dampers 600 and 650.

The front damper 500 may buffer vibration of the suction/discharge unit 400 and be formed of a rubber material. The front damper 500 may be coupled to a front upper portion of the cylinder block 310 by a fastener coupled to the clamp 492.

The rear damper 550 may buffer vibration of the compression unit 300, and be mounted on a rear upper portion of the cylinder block 310. The rear damper 550 may be formed of a rubber material.

The lower dampers 600 and 650 may buffer vibration of the driving unit 200 and be provided in a plurality. The plurality of lower dampers 600 and 650 may include a front lower damper 600 and a rear lower damper 650. The front lower damper 600 may buffer front vibration of the driving unit 200 and be mounted on a front lower portion of the stator core 210. The rear lower damper 650 may buffer a rear vibration of the driving unit 200 and be mounted on a rear lower portion of the stator core 210.

The balance weight 700 may be provided to control rotary vibration when the rotary shaft 250 of the driving unit 200 rotates, and may be coupled to the eccentric shaft 256 of the rotary shaft 250 above the connecting rod 340.

Hereinafter, configurations of the muffler assembly 410 and the discharge hose 800 will be described in detail.

Figure 4:
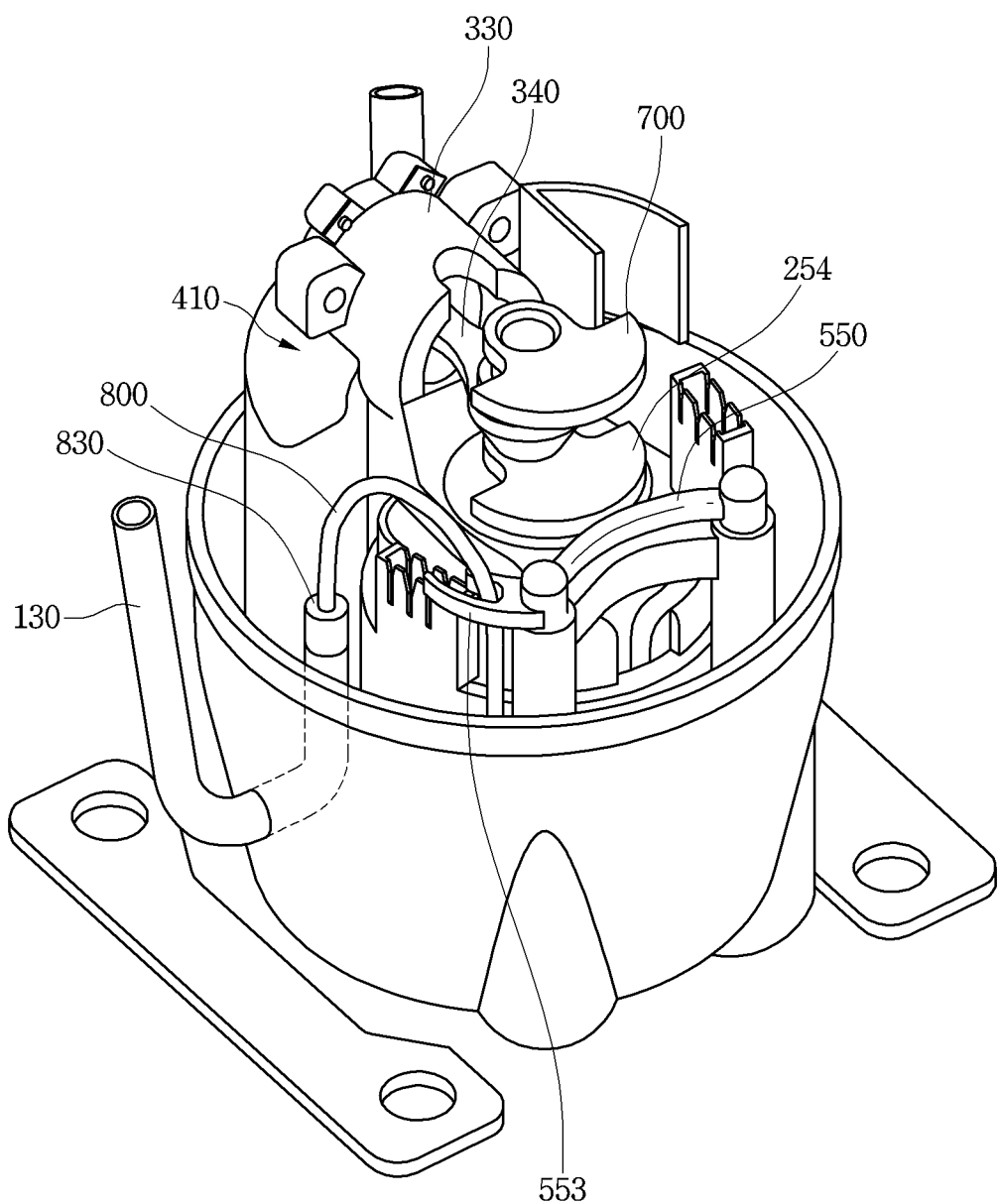
FIG. 4 is a view illustrating a partial configuration of a reciprocating compressor according to an embodiment of the present disclosure.
Figure 5:
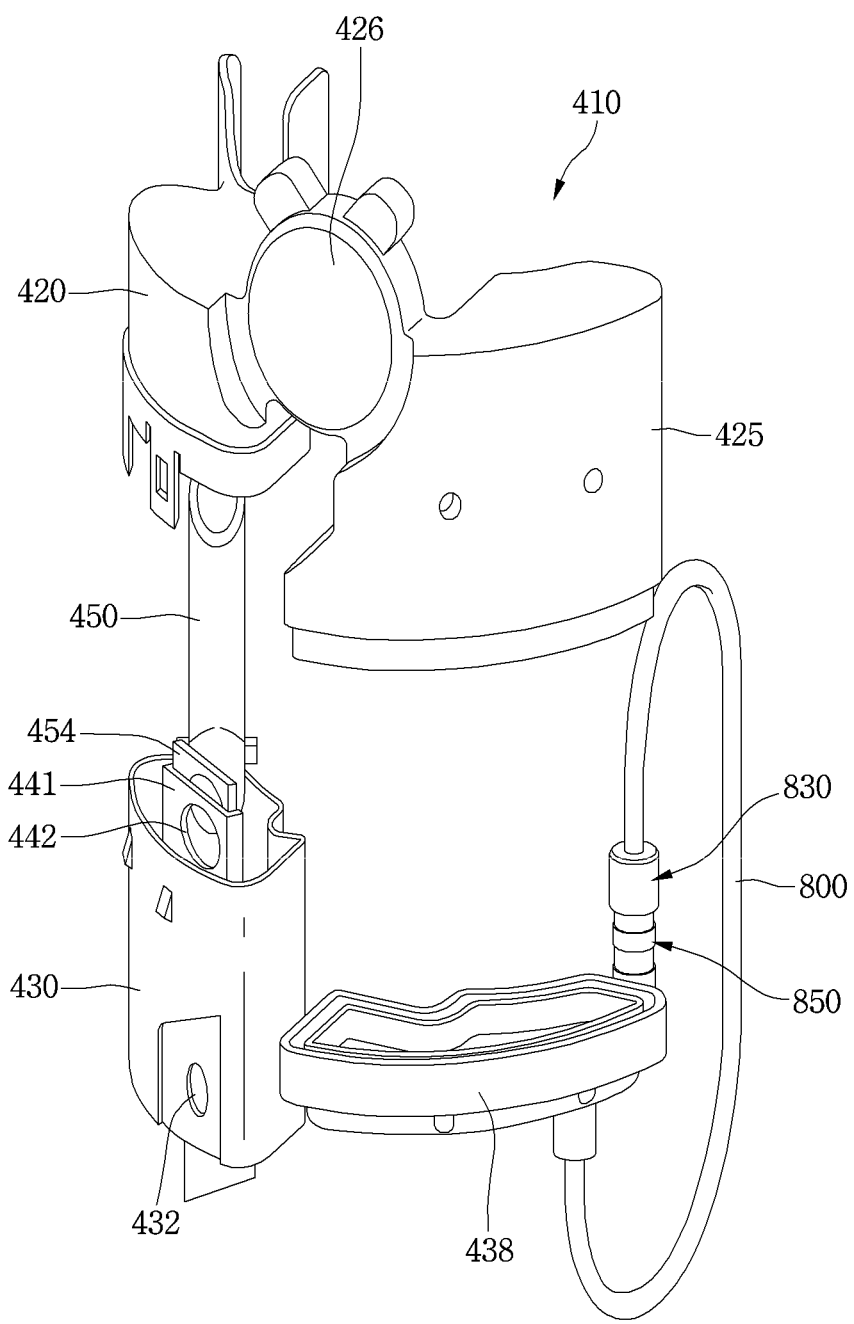
FIG. 5 is a front perspective view illustrating a state in which a muffler assembly is connected to a discharge hose according to an embodiment of the present disclosure.
Figure 6:
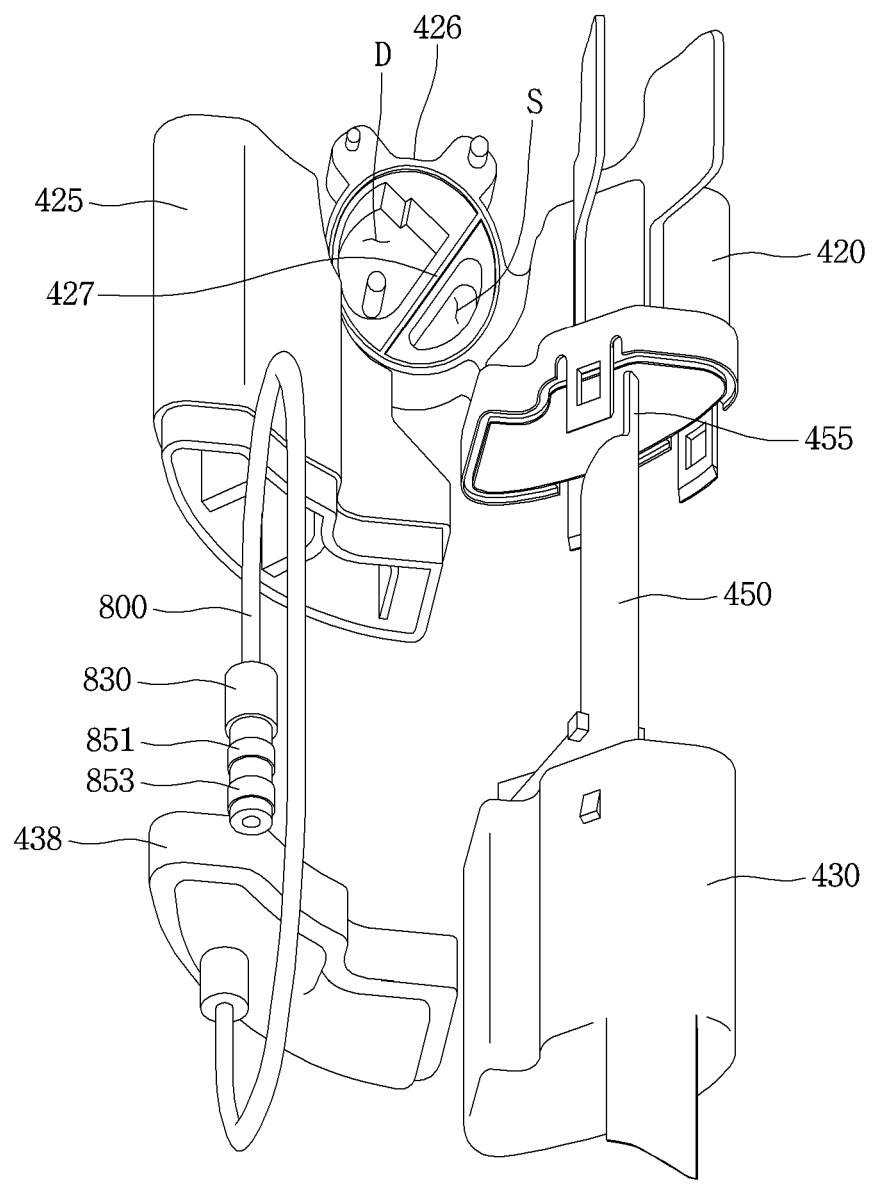
FIG. 6 is a rear perspective view illustrating the state in which the muffler assembly is connected to the discharge hose according to an embodiment of the present disclosure.
Figure 7:
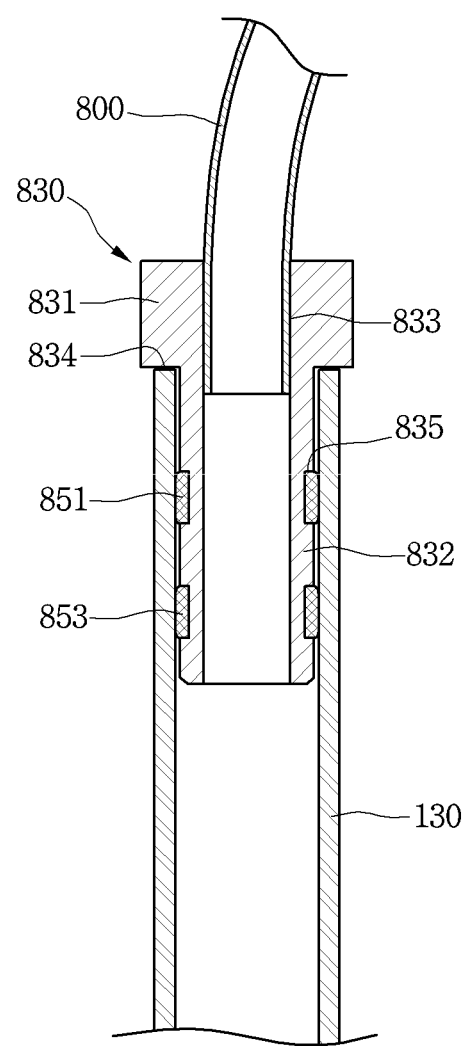
FIG. 7 is a cross-sectional view illustrating a state in which the discharge hose is coupled to a discharge pipe according to an embodiment of the present disclosure.

FIG. 4 is a view illustrating a partial configuration of a reciprocating compressor according to an embodiment of the present disclosure, FIG. 5 is a front perspective view illustrating a state in which a muffler assembly is connected to a discharge hose according to an embodiment of the present disclosure, FIG. 6 is a rear perspective view illustrating the state in which the muffler assembly is connected to the discharge hose according to an embodiment of the present disclosure, and FIG. 7 is a cross-sectional view illustrating a state in which the discharge hose is coupled to a discharge pipe according to an embodiment of the present disclosure.

Referring to FIGS. 4 to 7, the muffler assembly 410 according to an embodiment of the present disclosure may include the first assembly 430, the second assembly 420, the third assembly 425, and the fourth assembly 438. The first assembly 430 may include a suction hole 432 capable of being placed in communication with the suction pipe 120. The suction hole 432 may be positioned to abut an inner portion of one point of the lower shell 110 to which the suction pipe 120 is coupled.

An inner pipe 450 may be installed at an inner portion of the first assembly 430. As an example, the inner pipe 450 may be configured with a pipe formed in a nearly cylindrical shape.

A first fixing unit or first member 441 for fixing the inner pipe 450 may be installed at the inner portion of the first assembly 430. A through hole 442 corresponding to the suction hole 432 may be formed at the first fixing unit 441. Consequently, the suction hole 432 and the through hole 442 may be aligned with each other while the first fixing unit 441 is installed at an inner portion of the first assembly 430. In addition, the inner pipe 450 may include a first coupling unit or first coupler 454 coupled to the first fixing unit 441.

The inner pipe 450 may extend upward from the first assembly unit 430 to be coupled to the second assembly unit 420. The second assembly unit 420 may include a second fixing unit coupled to the inner pipe 450. In addition, the inner pipe 450 may include a second coupling unit 455 coupled to the second fixing unit.

The second assembly unit 420 may be coupled to an upper portion of the first assembly unit 430. At least a portion of the inner pipe 450 may be positioned at an inner portion of the first assembly unit 430, and the other portion of the inner pipe 450 may be positioned at an inner portion of the second assembly unit 420.

The second assembly 420 may be coupled to an upper portion of the first assembly 430. At least a portion of the inner pipe 450 may be positioned at an inner portion of the first assembly 430, and the other portion of the inner pipe 450 may be positioned at an inner portion of the second assembly 420.

When the first assembly 430 is coupled to the second assembly 420, a suction flow passage through which a refrigerant suctioned into the reciprocating compressor 10 may flow toward the cylinder 330 may be formed at inner portions of the first and second assemblies 430 and 420. Consequently, the first and second assemblies 430 and 420 together may be called a "suction muffler."

The third assembly 425 may be disposed apart from one side of the second assembly 420. In addition, between the second assembly 420 and the third assembly 425, the suction/discharge tank 426 forming the suction space (S) and the discharge space (D) may be installed. The suction/discharge tank 426 may include a dividing unit or divider 427 configured to divide an inner space of the suction/discharge tank 426 into the suction space (S) and the discharge space (D). In addition, the valve assembly 480 may be installed at one side of the suction/discharge tank 426, the suction space (S) may be blocked by the suction valve 481, and the discharge space (D) may be blocked by the discharge valve 483.

The fourth assembly 438 may be coupled to a lower portion of the third assembly 425. When the third assembly 425 is coupled the fourth assembly 438, a discharge flow passage through which a refrigerant discharged from the cylinder 330 flows toward the discharge pipe 130 may be formed at inner portions of the third and fourth assemblies 425 and 438. Consequently, the third and fourth assemblies 425 and 438 together may be called a "discharge muffler."

The discharge hose 800 may be coupled to the fourth assembly unit 438. The discharge hose 800 may transfer a refrigerant inside the fourth assembly unit 438 to the discharge pipe 130. One side of the discharge hose 800 may be coupled to the fourth assembly unit 438, and the other side thereof may be coupled to the discharge pipe 130.

The discharge hose 800 may extend a certain distance from the fourth assembly unit 438 toward the discharge pipe 130, and may be curved or bent to include one or more changes in direction to fit a limited inner space of the shell 100.

The discharge hose 800 may be formed of a plastic or rubber material. Because the discharge hose 800 may be formed of a relatively soft material and may have a relatively long length compared to a gap between the inner surface of the shell 100 and the fourth assembly unit 438, the discharge hose 800 may be positioned to abut an inner circumferential surface of the shell 100 if not controlled. Consequently, a device configured to guide the discharge hose 800 so as to not come in contact with the shell 100 may be required.

As this type of device, the present embodiment may include a hose restrainer 553. Specifically, a nearly central portion of the discharge hose 800 may be supported by the hose restrainer 553. The hose restrainer 553 may be coupled to the rear damper 550 and configured to clamp the discharge hose 800. As an example, the hose restrainer 553 may be formed in the shape of a pair of pincers, and disposed to surround at least a portion of an outer circumferential surface of the discharge hose 800. The discharge hose 800 may be guided by the hose restrainer 553 to be positioned apart from an inner surface of the shell 100.

The discharge pipe 130 may extend toward an inner portion of the lower shell 110 by penetrating the lower shell 110, and have the discharge hose 800 connected thereto. As an example, to facilitate connection of the discharge pipe 130 to the discharge hose 800, the discharge pipe 130 may be bent after penetrating the lower shell 110 to extend upward. The discharge pipe 130 may be formed of a metallic material, such as, copper (Cu).

The reciprocating compressor 10 may further include a connection member 830 to connect the discharge hose 800 to the discharge pipe 130. The connection member 830 may be formed of a plastic material with reinforced glass fiber. Consequently, the strength of the connection member 830 may be greater than that of the discharge hose 800.

The connection member 830 may include a first main connection body 831 to which the discharge hose 800 is coupled, and a second main connection body 832 configured to extend from the first main connection body 831 and to which the discharge pipe 130 is coupled. The second main connection body 832 may include an outer circumferential surface coupled to the inner circumferential surface of the discharge pipe 130.

The first main connection body 831 may include an insertion unit or portion 833 in which at least a portion of the discharge hose 800 may be accommodated. As an example, the insertion unit 833 may be formed to penetrate from one end portion of the connection member 830 toward the other end portion thereof. In other words, the insertion unit 833 may be formed by extending from the first main connection body 831 to the second main connection body 832. The insertion unit 833 forms an inner circumferential surface of the first main connection body 831 or the second main connection body 832.

The insertion unit 833 may include a coupling surface to which an outer circumferential surface of the discharge hose 800 is coupled. As an example, the outer circumferential surface of the discharge hose 800 may be coupled to the coupling surface by glue, extrusion coating, welding, and the like The second main connection body 832 may extend in steps from the first main connection body 831.

Specifically, stepped portions of the first main connection body 831 and the second main connection body 832 may include a locking step 834 locked to an outer surface of the discharge pipe 130. The locking step 834 may be defined between the first main connection body 831 and the second main connection body 832, and may be understood as a "stopper" that limits a position into which the discharge pipe 130 is inserted.

With respect to the locking step 834, the width or diameter of the first main connection body 831 in one direction (horizontal direction with reference to FIG. 7) may be formed greater than the width or diameter of the second main connection body 832 in the same direction.

When the discharge pipe 130 is coupled to an outer portion of the connection member 830, the second main connection body 832 may be inserted into an inner portion of the discharge pipe 130. The second main connection body 832 may be inserted until the discharge pipe 130 is locked to the locking step 834. The discharge pipe 130 may be supported by the locking step 834.

Figure 8:
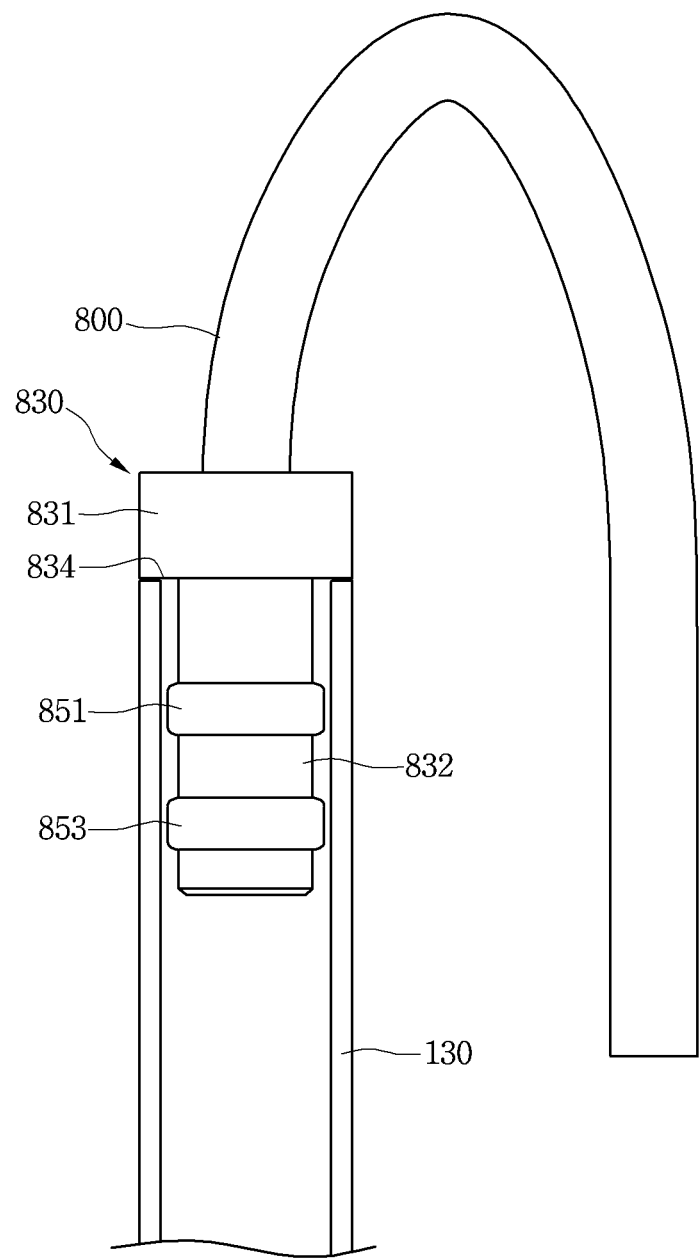
FIGS. 8 and 9 are views illustrating a state in which the discharge hose is assembled with the discharge pipe according to an embodiment of the present disclosure.
Figure 9:
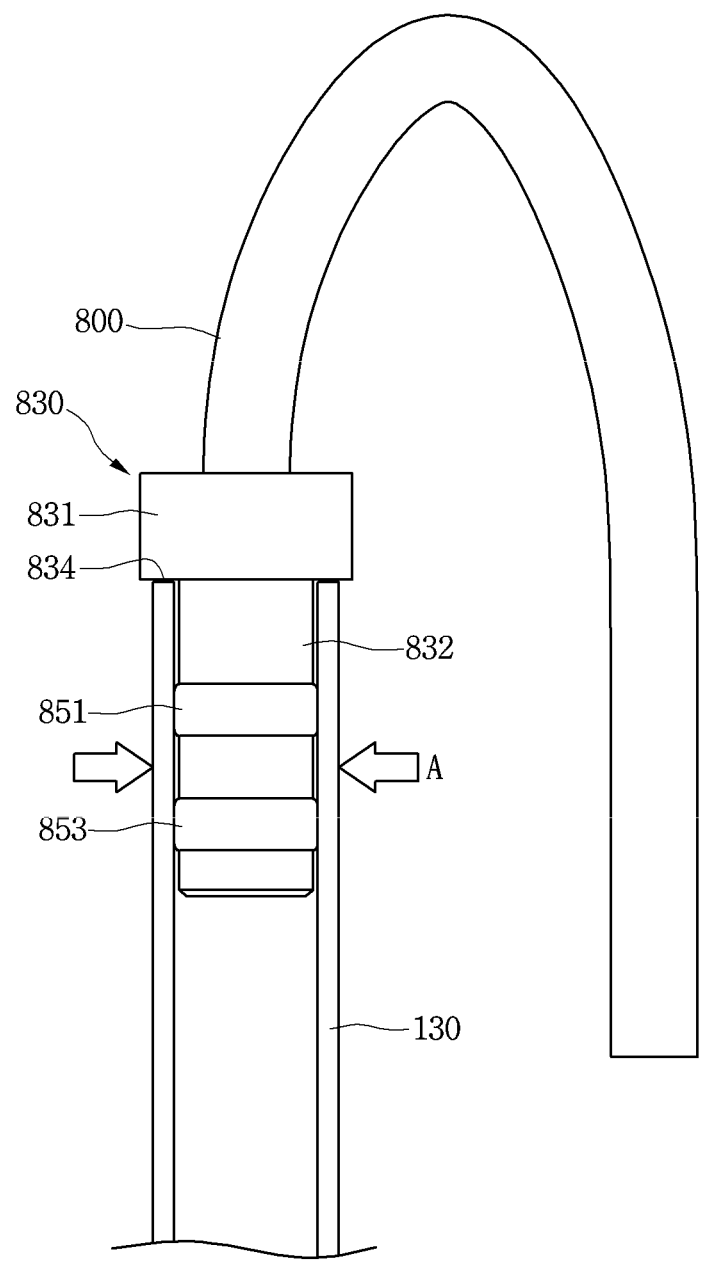

In addition, when the insertion of the second main connection body 832 is complete, the diameter of the discharge pipe 130 may be reduced by a diameter decreasing process (see FIGS. 8 and 9). One example of such a diameter decreasing process is a crimping process; however, any process that can be used to decrease the diameter of the discharge pipe 130 may be suitable.

The first main connection body 831 may be positioned outside the discharge pipe 130, and the second main connection body 832 may be positioned inside an inner portion of the discharge pipe 130.

One or more interference members 850 may be coupled to the connection member 830. As an example, the one or more interference members 850 may be coupled to an outer circumferential surface of the connection member 830 and arranged to come in close contact with an inner circumferential surface of the discharge pipe 130.

The one or more interference members 850 may include a first interference member 851 disposed to surround an outer circumferential surface of the second main connection body 832, and a second interference member 853 disposed apart from the first interference member 851 to surround the outer circumferential surface of the second main connection body 832. As an example, the first and second interference members 851 and 853 may have a ring shape, such as an O-ring. The first and second interference members 851 and 853 may be formed of a plastic or rubber material.

Groove 835 in which the first and second interference members 851 and 853 are coupled or seated may be formed at the second main connection body 832. Each groove 835 may be recessed from the outer circumferential surface of the second main connection body 832 to have a ring shape so as to correspond to the shape of one of the first and second interference members 851 and 853 to be seated therein.

The first and second interference members 851 and 853 may be interposed between the connection member 830 and the discharge pipe 130 to increase a frictional force between the connection member 830 and the discharge pipe 130, thereby enabling firm coupling of the connection member 830 to the discharge pipe 130.

Hereinafter, a process of assembling the discharge hose 800 with the discharge pipe 130 according to the present embodiment will be described.

FIGS. 8 and 9 are views illustrating a process of assembling a discharge hose with a discharge pipe according to an embodiment of the present disclosure, and FIG. 10 is a flow chart illustrating a process of assembling the discharge hose with the discharge pipe according to an embodiment of the present disclosure.

Referring to FIGS. 8 to 10, according to an embodiment of the present disclosure, the first and second interference members 851 and 853 may be coupled to an outer circumferential surface of the connection member 830. Specifically, the first and second interference members 851 and 853 may be spaced apart on the outer circumferential surface of the second main connection body 832 and may be installed at the groove 835 (S11).

The discharge hose 800 may be inserted into the insertion unit 833 of the connection member 830, and an outer circumferential surface of the discharge hose 800 may be coupled to the coupling surface of the insertion unit 833. As mentioned above, the outer circumferential surface of the discharge hose 800 may be coupled to the coupling surface by glue, extrusion coating, welding, and the like (S12).

The connection member 830 may be inserted into an inner portion of the discharge pipe 130. Specifically, the second main connection body 832 of the connection member 830 may be inserted into the inner portion of the discharge pipe 130 until the locking step 834 is supported on an end portion of the discharge pipe 130 (S13).

A process (A) of reducing the diameter of the discharge pipe 130 is performed, so that the first and second interference members 851 and 853 may come in close contact with the discharge pipe 130. As an example, reducing the diameter of the discharge pipe 130 may be performed by a crimping process (S14).

By the process described above, the discharge hose 800 may be firmly coupled to the discharge pipe 130 through the connection member 830 and the interference member 850, thereby preventing the end of the discharge hose 800 from moving relative to the discharge pipe 130, and thus preventing the discharge hose 800 from being damaged due to contact with the shell 100 at a high temperature. In addition, leakage of a refrigerant from the portion at which the discharge hose 800 is coupled to the discharge pipe 130 due to loosening of the coupling between the discharge hose 800 and the discharge pipe 130 may be prevented.

According to the present disclosure, a discharge hose may be firmly coupled to a discharge pipe by a connection member, thereby preventing the discharge hose from moving while a refrigerant is flowing, and thus preventing the discharge hose from being damaged when the discharge hose comes in contact with a wall of a shell at a high temperature.

In addition, a locking step or stopper is provided at the connection member such that the connection member may be fixed outside the discharge pipe, thereby preventing the discharge hose from being pushed into an inner portion of the discharge pipe while the refrigerant is discharged.

In addition, an interference member configured to increase a frictional force between the connection member and the discharge pipe is provided at an outer circumferential surface of the connection member, such that the connection member may be firmly coupled to the discharge pipe, thus preventing the discharge hose from moving.

Hereinbefore, preferred embodiments of the present disclosure have been shown and described, but the present disclosure is not limited to the particular embodiments mentioned above. The embodiments may be modified in various ways by those of ordinary skill in the art to which the present disclosure pertains without departing from the gist of the present disclosure which is claimed in the claims below, and such modifications should not be understood as separate from the technical spirit or purview of the present disclosure.

What is claimed is:

1. A reciprocating compressor, comprising:
   a shell having an inner portion;
   a discharge pipe coupled to the shell and formed of metallic material, the discharge pipe having an inner portion;
   a driver located at the inner portion of the shell to generate a rotary force;
   a compressor located in the shell, the compressor including:
   a connecting rod configured to convert the rotary force to a linear driving force;
   a piston connected to the connecting rod; and a cylinder into which the piston is movably inserted;

a discharge hose through which a refrigerant compressed in the cylinder is discharged, the discharge hose being disposed adjacent an inner circumferential surface of the shell defining the inner portion; and a connection member configured to connect the discharge hose to the discharge pipe, a first portion of the connection member being inserted into the inner portion of the discharge pipe and a second portion of the connection member being supported outside the discharge pipe, and the connection member having an insertion portion into which the discharge hose is inserted and including:

a first main connection body having a hollow cylindrical shape;

a second main connection body having a hollow cylindrical shape and extending from the first main connection body, the second main connection body being inserted into the inner portion of the discharge pipe and having an outer circumferential surface on which at least one groove is formed, wherein the insertion portion forms inner circumferential surfaces of the first and second main connection bodies; and a locking step defined by a junction of the first main connection body and the second main connection body, wherein an end portion of the discharge pipe supports the locking step, wherein, with respect to the locking step, a diameter of the first main connection body is formed greater than that of the second main connection body, wherein the reciprocating compressor further comprises at least one interference member installed in the at least one groove and arranged to come in close contact with an inner circumferential surface of the discharge pipe.

2. The reciprocating compressor according to claim 1, wherein the at least one interference member includes a first interference member and a second interference member spaced apart from the first interference member on the outer circumferential surface of the second main connection body.

3. The reciprocating compressor according to claim 1, further comprising a muffler assembly into which a refrigerant compressed in the cylinder is introduced, and from which the discharge hose extends toward the discharge pipe.

4. The reciprocating compressor according to claim 3, further comprising a clamp to catch a portion of the discharge hose so as to space the discharge hose apart from the inner circumferential surface of the shell.

5. The reciprocating compressor according to claim 1, wherein the at least one interference member has a ring shape.

6. The reciprocating compressor according to claim 1, wherein the at least one groove is recessed from the outer circumferential surface to have a ring shape.

7. The reciprocating compressor according to claim 1, wherein the at least one interference member is formed of a plastic or rubber.

8. The reciprocating compressor according to claim 1, wherein the at least one interference member includes a first interference member and a second interference member, and wherein the at least one groove comprises two grooves in which the first interference member and the second interference member are installed.

* * * * *